Figure 1:
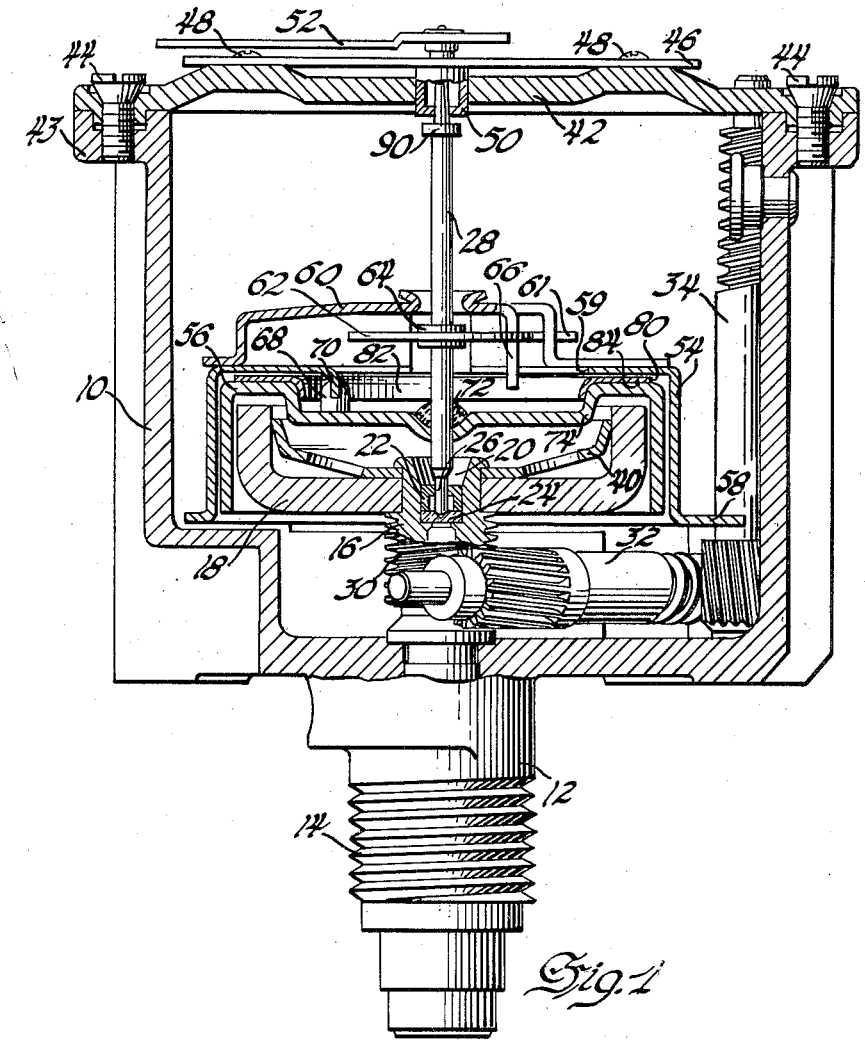

July 2, 1957  R. O. HELGEBY  2,798,174
NO TIPPING ERROR SPEED CUP INSTRUMENT
Filed Sept. 29, 1955

INVENTOR
Ralph O. Helgeby
BY J. W. Lovett
ATTORNEY

United States Patent Office 2,798,174
Patented July 2, 1957

2,798,174

NO TIPPING ERROR SPEED CUP INSTRUMENT

Ralph O. Helgeby, Flint, Mich., assignor to General Motors Corporation, Detroit, Mich., a corporation of Delaware Application September 29, 1955, Serial No. 537,399

7 Claims. (Cl. 310—97)

This invention relates to magnetically driven instruments and more particularly to instruments such as speedometers and tachometers employing spring biased pointers actuated by speed cups.

Magnetically driven instruments are often provided with spindles carrying pointers adapted to indicate readings of the instruments upon an associated scale or dial. Such a spindle must necessarily be mounted in bearings preventing lateral movement with respect to the instrument casing and also limiting axial movement. Some end play must be permitted the spindle if friction is to be minimized. This end play is not objectionable in many uses and particularly if the instrument is operated without any great variation in the inclination of the spindle or angular positioning of the instrument with respect to the horizontal. However, if a given instrument is tipped to cause the spindle to move longitudinally with respect to its bearings, the clearance between the speed cup employed to rotate the spindle and the magnet causing said rotation will vary. Obviously, if the clearance between a given speed cup and its driving magnet varies, the effect of the magnet on the cup and spindle will fluctuate giving an inaccurate reading. When such instruments are used on airplanes, for example, the effect of tilting the instruments is quite pronounced and is evidenced by the erratic performance of the instruments while in flight.

An object of the present invention is to provide an improved instrument employing a magnetically driven speed cup for actuating a pointer.

Another object of the invention is to provide an instrument such as a speedometer or tachometer in which a pointer is magnetically rotated an extent dependent upon the drag effect of a rotating magnet and uneffected by a change in position or tipping of the instrument.

To these ends, a feature of the present invention includes a magnetically attracted annular covering arranged to maintain constant clearance between a speed cup and a rotating magnet actuating an instrument. Another feature resides in a speedometer or tachometer type instrument in which a spindle is retained against longitudinal movement by means of magnetic attraction effected through a speed cup driving the spindle.

These and other important features of the invention will now be described in detail in the specification and then pointed out more particularly in the appended claims.

Figure 2:
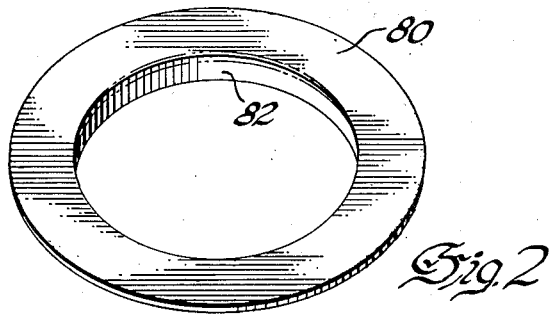

In the drawings:

Fig. 1 is a sectional view through a speedometer which embodies the present invention; and Fig. 2 is a perspective view of an element shown in the assembly of Fig. 1.

The present invention is illustrated in the drawings by the pertinent portions of a speedometer similar to the speedometer disclosed in the United States Patent 2,627,401 granted February 3, 1953, in the name of Henry H. Harada and entitled "Speed Cup Bias Spring." The instrument is provided with a casing 10 having a projection 12 thereon which is threaded as at 14 to form a suitable connection for the end of a conduit guiding a drive cable. Such conduits and cables are not illustrated but are conventional in such instances. As will be understood, the drive cable is such as to rotate a shaft 16 and thereby rotate a permanent magnet element 18 within the casing. The end of the shaft 16 is recessed as at 20 to retain bearing members 22 and 24. The bearing member 22 surrounds a reduced end portion 26 of a spindle 28 to prevent lateral motion of the latter. The bearing 24 is in the form of a thrust bearing and is adapted to engage one end of the spindle 28.

It will be noted that the shaft 16 has spiral teeth 30 and it will be understood that these are utilized to drive two shafts 32 and 34 for operating an odometer, not shown, but included within the casing 10. The shafts 32 and 34 and the gearing associated therewith may be ignored in the present instance as they form no part of the present invention. They are illustrated because they are conventional in speedometers. If the present invention is to be used on a tachometer, these shafts and the gearing would be omitted.

Fixed within the magnet 18 and securely clamped to the shaft 16 to rotate therewith is a temperature compensator element 40 which is of a type disclosed in the United States Patent 1,848,068 granted March 1, 1932, in the name of I. T. Wedin and entitled "Speedometer Temperature Compensator."

The casing 10 is in the form of a cup and is provided with a cover 42 attached to a flange 43 of the casing by means of screws 44. A dial 46 with suitable insignia or scaled graduations thereon is attached to the cover 42 by means of screws 48.

One end of the spindle 28 protrudes from a bearing member 50 located in the center of the cover 42. The spindle also protrudes through the dial 46 and is fitted with a pointer 52 adapted to register with the graduations on the dial 46.

As in the case of the patent 2,627,401 heretofore referred to, a field plate 54 is provided in the casing and encloses a speed cup 56. The field plate 54 is flanged as at 58 for attachment by means, not shown, to the casing 10. As the patent, the field plate 54 is provided with a central opening 59 and with a support or bridge member 60 against which one end 61 of a spiral biasing spring 62 is adapted to bear. The other end of the spring is attached to a hub 64 formed on the spindle 28. The bridge member 60 has a projection 66 extending through the opening 59 and constituting a limit stop for the speed cup 56. A tab or second limit stop 68 is formed on the speed cup and is adapted to engage a fixed stop portion 70 integral with the field plate 54.

As is clearly seen in Fig. 1, the speed cup 56 is fixed to the spindle 28 by means of solder 72. The central portion of the speed cup is depressed as at 74 to extend within the ends of the magnetic means 18.

A peripheral clearance space exists between the magnetic means 18 and the cylindrical portion of the speed cup 56 and also between the latter and the cylindrical portion of the field plate 54. Clearances as measured parallel with the spindle 28 also exist between the magnet 18 and the cup 56 as well as between the latter and the field plate 54.

The speed cup 56 is made of low permeability and low electrical resistance metal and is preferably of aluminum. It may be made of copper, silver or gold. Such speed cups are widely used in instruments of the type herein considered.

The field plate 54 is composed of a high permeability material and may have a low electrical resistance and is also a conventional item. It may be made of steel.

Affixed to the speed cup 56 is an annular covering 80 having an inner flange 82 extending within the recessed portion of the speed cup. This annular covering is preferably of a ferrous composition and is preferably in the form of a solid ring fixed to the speed cup by means of an adhesive 84. This ring may be made of iron particles or dust adhesively attached to the speed cup. The attachment of the annular covering or ring to the speed cup may be by rivets or other means. To gain the effect as further described hereinafter, the composition of the annular covering 80 should have the characteristic of high permeability and may be of the same composition as the field plate 54.

As in the case of Patent 2,627,401, a rotation of the shaft 16 serves to rotate the magnet 18 at the same speed as the cable. As a consequence the flux linkage from the magnet exerts a drag on the speed cup 56 which is proportional to the speed or revolutions per minute of the magnet to create a proper measurement by virtue of the relative position of the pointer 52 with respect to the dial 46. This rotation of the speed cup 56 and spindle 28 is against the action of the spring 62 which tends to return the pointer to zero or the stop 68 against the projection 70 when rotation of the shaft 16 terminates. The force exerted by the spring 62 is proportional to the angular position from zero of the speed cup.

If the features of the present invention were not embodied in the instrument disclosed in the drawings, the spindle 28 would be subjected to a longitudinal or axial movement represented by the distance between a shoulder portion 90 on the spindle 28 and the inner surface of the bearing 50. This end play for bearing clearance would permit a variance in the clearance between the magnet 18 and the speed cup 56 when the instrument parts are subjected in changing extent to outside forces such as gravity, acceleration or deceleration.

With the use of the present invention, however, the annular covering 80 is attracted to the magnet 18 in a direction parallel with the spindle 28. As a consequence, the end of the spindle 28 is retained in engagement with the thrust bearing 24 and the clearance between the magnet 18 and the speed cup 56 is maintained constant despite forces which may tend to bring about longitudinal or axial movement of the spindle.

Only a very slight force need be magnetically produced by interaction of the magnet 18 with the ferrous covering 80 to eliminate the end play of the spindle. This very slight force is exerted in a direction parallel with the spindle as stated and, therefore, does not affect the instrument reading which is dependent only on the forces exerted around the spindle. The linearly effective force is so slight that it will not increase appreciably the wear on the bearing 24 and in most cases it is not necessary to increase the load on the thrust bearing 24 sufficiently to overcome the full force of gravity such as would be exerted if the instrument spindle 28 pointed directly downward as such a positioning of the instrument is unusual.

I claim:

1. An instrument such as a speedometer or tachometer including a spindle, a fixed bearing adapted to engage said spindle in a direction parallel with the latter, an annular speed cup fixed to said spindle to rotate therewith, magnetic means arranged to be rotated with respect to said cup and on the same axis, an annular covering fixed to said cup, said cup being interposed between said magnetic means and said annular covering, said annular covering being of material characterized by high permeability, and the arrangement being such that said annular covering is attracted by said magnetic means to maintain the engagement of said spindle and bearing.

2. An instrument including a spindle, a bearing adapted to engage one end of said spindle, an annular speed cup fixed to said spindle to rotate therewith, magnetic means arranged to be rotated with respect to said cup and on the same axis, an annular covering fixed to said cup, said cup being interposed between said magnetic means and said annular covering, said annular covering being of a material characterized by high permeability, and said annular covering being attracted by said magnetic means in a direction parallel with said spindle to maintain the engagement of the end of said spindle with said bearing to prevent axial movement of the spindle.

3. An instrument such as a speedometer or tachometer including a spindle, a fixed bearing adapted to engage said spindle to prevent axial movement of the latter, an annular speed cup fixed to said spindle to rotate therewith, magnetic means arranged to be rotated with respect to said cup and on the same axis, an annular covering fixed to said cup, said cup being interposed between said magnetic means and said annular covering, said speed cup being of metal having relatively low permeability, said annular covering being of material having relatively high permeability, and said annular covering being attracted by said magnetic means to maintain the engagement of said spindle and bearing.

4. An instrument including a casing, a shaft journaled in said casing and adapted to be rotated, magnetic means fixed to said shaft for rotation therewith, a bearing mounted coaxially with said shaft and magnetic means, a spindle with an end portion adapted to engage said bearing, a speed cup fixed to said spindle to rotate therewith and spaced from said magnetic means, an annular covering of high permeability material fixed to said speed cup on the side thereof opposite the said magnetic means, and the arrangement being such that said annular covering is attracted by said magnetic means to maintain the engagement of said spindle and bearing.

5. An instrument including a spindle, a bearing adapted to engage said spindle to prevent axial movement of the latter, an annular speed cup fixed to said spindle to rotate therewith, magnetic means arranged to be rotated with respect to said cup and spaced from the latter and on the same axis, a ferrous ring fixed to said cup, said cup being interposed between said magnetic means and said ferrous ring, and the arrangement being such that said ferrous ring is attracted by said magnetic means to maintain engagement of said spindle and bearing.

6. An instrument in the class of speedometers and tachometers including a spindle, a bearing adapted to engage said spindle to prevent axial movement of the latter, a speed cup fixed to said spindle to rotate therewith, magnetic means arranged to be rotated in one direction with respect to said cup and on the same axis, an annular covering fixed to said cup, said covering being of ferrous composition having high permeability, a biasing spring with one end in fixed relation with respect to said casing and the other end fixed to said spindle to resist rotation of the latter in said one direction, and the arrangement being such that said annular covering is attracted by said magnetic means in a direction parallel with said spindle to maintain the engagement of said spindle and bearing.

7. An instrument including a casing, a spindle mounted in said casing, a magnet mounted for rotation in said casing, a speed cup fixed to said spindle with a predetermined clearance between the cup and said magnet, a covering of high permeability composition fixed to said speed cup on the side thereof opposite the said magnet, and the arrangement of the said magnet and covering being such that said clearance is maintained magnetically.

References Cited in the file of this patent

FOREIGN PATENTS

| | | |
|---|---|---|
| 676,637 | Great Britain | July 30, 1952 |
| 824,231 | Germany | Dec. 10, 1951 |